US012578010B2

(12) United States Patent
Neidhardt et al.

(10) Patent No.: US 12,578,010 B2
(45) Date of Patent: Mar. 17, 2026

(54) OIL GUIDING COMPONENT FOR AN OIL GUIDING ARRANGEMENT

(71) Applicant: ZF Friedrichshafen AG, Friedrichshafen (DE)

(72) Inventors: Philipp Neidhardt, Markdorf (DE); Philip Dötschel, Friedrichshafen (DE); Tamas Gyarmati, Bermatingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/932,206

(22) Filed: Oct. 30, 2024

(65) Prior Publication Data
US 2025/0137522 A1 May 1, 2025

(30) Foreign Application Priority Data
Oct. 31, 2023 (DE) .......................... 102023210774.0

(51) Int. Cl.
*F16H 57/04* (2010.01)
*F16H 48/10* (2012.01)

(52) U.S. Cl.
CPC .......... *F16H 57/0423* (2013.01); *F16H 48/10* (2013.01); *F16H 57/0408* (2013.01); *F16H 57/043* (2013.01); *F16H 57/045* (2013.01); *F16H 57/0471* (2013.01); *F16H 57/0472* (2013.01); *F16H 57/0483* (2013.01); *F16H 2048/104* (2013.01); *F16H 2048/106* (2013.01)

(58) Field of Classification Search
CPC ............. F16H 57/0423; F16H 57/0408; F16H 57/0471; F16H 57/0472; F16H 57/0483; F16H 57/0479
See application file for complete search history.

(56) References Cited

U.S. PATENT DOCUMENTS 8,348,800 B2 * 1/2013 Tanaka ..................... B60K 1/00
475/221
11,486,489 B2 * 11/2022 Willburger .......... F16H 57/0471
(Continued)

FOREIGN PATENT DOCUMENTS

DE 102022213923 A1 6/2024

OTHER PUBLICATIONS

German Search Report for Application DE102023210774.0 Dated Jun. 21, 2024.

*Primary Examiner* — Huan Le
(74) *Attorney, Agent, or Firm* — Dority & Manning, P.A.

(57) ABSTRACT

An oil guiding component for an oil guiding arrangement has a body rotationally fixedly connectable to a stationary component of the oil guiding arrangement, the stationary component defining a main oil channel. The body defines a first chamber opening in a radial direction toward an outer side of the body and being fluidly connectable to the main oil channel. The body also defines a second chamber opening in the radial direction toward an inner side of the body. The first chamber is outside of the second chamber in the radial direction and overlaps the second chamber in an axial direction. The first chamber is fluidly connected to the second chamber via a connection passage. The second chamber is fluidly connectable to a shaft passage through which an outer side and an inner space of a second output shaft of the oil guiding arrangement are in fluid communication.

17 Claims, 4 Drawing Sheets

(56) References Cited

U.S. PATENT DOCUMENTS

| | | | | |
|---|---|---|---|---|
| 2009/0098969 A1 * | 4/2009 | Tabata | ................... | B60K 6/365 |
| | | | | 903/910 |
| 2024/0200649 A1 | 6/2024 | Gyarmati et al. | | |

* cited by examiner

OIL GUIDING COMPONENT FOR AN OIL GUIDING ARRANGEMENT

CROSS-REFERENCE TO RELATED APPLICATION

The present application is related and has right of priority to German Patent Application No. 10 2023 210 774.0 filed on Oct. 31, 2023, the entirety of which is incorporated by reference for all purposes.

FIELD OF THE INVENTION

The present invention relates generally to an oil guiding component for an oil guiding arrangement, an oil guiding arrangement for a transmission, a transmission for a vehicle, and a vehicle.

BACKGROUND

Oil guiding arrangements supplying oil to different components of a transmission for lubrication and cooling are known. The transmission includes an output shaft and a gearset. A spur gear of the gearset can be in engagement with a toothing which is non-rotatably connected with the output shaft. In a known oil guiding arrangement, transverse bores in the output shaft effect the oiling of the gearset. This weakens the output shaft.

SUMMARY OF THE INVENTION

It is a goal of the present invention to provide an improved oil guiding arrangement.

An oil guiding component for an oil guiding arrangement is provided. The oil guiding arrangement includes a stationary component with a main oil channel, a first output shaft and a second output shaft. The stationary member is a gearing housing. The oil guiding component includes a first chamber and a second chamber. One of the first chamber and the second chamber includes a rectangular cross-section. One of the first chamber and the second chamber is annular.

An outer side of the second output shaft is in fluid communication with an inner space of the second output shaft via a shaft passage. The shaft passage is formed in the second output shaft. The shaft passage extends in a radial direction of the second output shaft. The shaft passage may be formed as a bore. A plurality of shaft passages are provided. The shaft passages are evenly distributed in the circumferential direction.

The oil guiding component is configured such that it is rotationally fixedly connectable to the stationary component. The oil guiding component is, at least in sections, rotationally symmetrical. The oil guiding component is rotationally fixedly connected to the stationary component by a screw connection. The screw connection is provided in an axial direction. The oil guiding component includes a flange for the screw connection. The oil guiding component is pressed into the stationary component. The oil guiding component includes a non-rotationally symmetrical outer surface for securing against rotation. The non-rotationally symmetrical outer surface is elliptical.

The first chamber is open in a radial direction toward an outer side. The first chamber is configured such that it is fluidly connectable to the main oil channel. The second chamber is open in a radial direction toward an inner side. The second chamber is configured such that it is fluidly connectable to the shaft passage. The first chamber is disposed outside the second chamber in a radial direction and overlaps the second chamber in an axial direction. The first chamber overlaps the second chamber in regions. The first chamber is disposed in an axial direction within the second chamber. The first chamber protrudes beyond the second chamber in an axial direction. The first chamber is fluidly connected to the second chamber via a connection passage. The connection passage may be formed as a bore. A plurality of connecting passages are arranged in the circumferential direction. The connection passages are evenly distributed in the circumferential direction.

If two elements are in fluid communication with each other, a fluid, for example oil, is conducted from one element to the other element. In this case, the fluid communication is leak-free so that the oil is conducted substantially completely from one element to the other element.

In an embodiment, two grooves are formed on a circumferential surface of the oil guiding component for receiving a seal. The grooves are formed on an outer circumference. Further grooves may be provided. Three grooves may be provided. A plurality of the grooves may differ from one another in their cross-section. The seal is an O-ring. The first chamber is disposed between the two grooves. The first chamber is sealed to an outer side via seals when the oil guiding component is installed in the stationary component.

Sealing is understood to mean limiting a leakage of a fluid, for example, from one side of the seal member in an axial direction to the other side of the seal member. A fluid may be oil. In this case, a certain degree of leakage may be permitted, for example in order to lubricate a contact surface between the seal member and a component moving relative thereto by the fluid.

In an embodiment, two cylindrical annular surfaces are formed on a circumferential surface of the oil guiding component for receiving a seal member. The cylindrical annular surfaces are formed on an inner circumference. The seal member is a rectangular ring. The rectangular ring includes a fastening ring on an inner circumference. The fastening ring is rotationally fixedly connected to one of the cylindrical annular surfaces of the oil guiding component. The second chamber is disposed between the two annular surfaces. The second chamber is sealed via seal members to an outer side when the oil guiding component is installed in the stationary component. A slight leakage of oil is provided in particular across the seal members.

In an embodiment, a cylindrical receiving surface is formed on a circumferential surface of the oil guiding component for receiving a radial shaft seal ring between one of the annular surfaces and an outer side of the oil guiding component. The cylindrical receiving surface is formed on an inner circumference. The cylindrical receiving surface is grooved in the circumferential direction.

In an embodiment, a drain hole is formed in an axial direction between the cylindrical receiving surface and one of the cylindrical annular surfaces. As a result, oil overpressure in a space between the radial shaft seal ring and the rectangular ring is avoided when the oil guiding component is installed in the stationary component.

In an embodiment, a first end portion at which the first chamber is arranged includes an outer circumference with a diameter smaller than an outer circumference of a second end portion located opposite in an axial direction. The second end region is provided on an outer side of the stationary component when the oil guiding component is installed in the stationary component. The first end region aids insertion of the oil guiding component into the stationary component. The first end region includes the two grooves with a first chamber located therebetween. A further groove for a seal is provided on the second end region. The cylindrical receiving surface for the radial shaft seal ring is disposed in an axial direction within the second end portion. The first end region is connected to the second end region via a step portion.

In one aspect, an oil guiding arrangement for a transmission is provided. The transmission includes a first gearset with a first spur gear. The oil guiding arrangement includes a first output shaft, a second output shaft, a first carrier, a first bolt, a stationary component and an oil guiding component according to any one of the preceding embodiments. The first bolt is configured such that it rotatably supports the first spur gear. The first bolt is connected to the first carrier. The first output shaft, the second output shaft, the oil guiding component, and the first carrier are arranged coaxially.

If two elements are connected to each other, the elements are coupled to each other by one or more connection points. However, relative movements between these elements at the connection points and around the connection points, such as a pivoting or a translational movement, is possible.

The stationary component includes a main oil channel. An outer side of the second output shaft is in fluid communication with an inner space of the second output shaft via a shaft passage. The inner space of the second output shaft is a cavity open in an axial direction to an outer side of the second output shaft. The main oil channel is fluidly connected to the shaft passage via the oil guiding component.

An oil channel for the first gearset is formed by a gap between the first output shaft and the second output shaft. The gap is an annular gap. The annular gap includes step and cross-sectional changes. The oil channel for the first gearset is fluidly connected with the shaft passage. The oil channel for the first gearset is fluidly connected with one end of the shaft passage in the oil flow direction.

An oil channel for the first bolt is formed by a gap between the first carrier and the second output shaft. The gap is an annular gap. The annular gap includes step and cross-sectional changes. The oil channel for the first bolt is fluidly connected with the oil channel for the first gearset. The oil channel for the first bolt is fluidly connected to the first bolt. An oil channel for the first bolt is fluidly connected with one end of the oil channel for the first gearset in the oil flow direction.

An oil channel for the first spur gear is formed by a gap between the first output shaft and the first carrier. The gap is an annular gap. The annular gap includes step and cross-sectional changes. The oil channel for the first spur gear is fluidly connected with the oil channel for the first gearset. The oil channel for the first spur gear is fluidly connected to the first spur gear. The oil channel for the first spur gear is fluidly connected with one end of the oil channel for the first gearset in the oil flow direction. The oil channel for the first bolt and the oil channel for the first spur gear is fluidly connected with the oil channel for the first gearset at the same position.

If an oil channel is formed by a component, this component forms the oil channel sectionwise. The oil channel may be continued outside the component. The component may interact with a further component such that the oil channel is formed.

An oil flow direction is the direction of the oil in which it moves in the oil guiding arrangement in order to reach the components which are lubricated. In particular, a start of an oil channel is upstream of an end of an oil channel in the oil flow direction.

The second output shaft is rotatably supported on the stationary component by a first bearing. Leakage at one of the sealing elements effects the oiling of the radial shaft seal ring. Leakage at another of the seal members effects the oiling of the first bearing of the second output shaft.

In an embodiment, the oil guiding arrangement includes a bearing which rotatably supports the first output shaft in the second output shaft. The oil channel for the first gearset is fluidly connected with the bearing of the first output shaft.

The first output shaft extends at least partially within the second output shaft. The first output shaft and the second output shaft form an annular gap. A bearing seat for the bearing of the first output shaft is formed in the annular gap. The bearing of the first output shaft may be a plain bearing. The bearing of the first output shaft may be a needle bearing. The first output shaft is hollow. A plug is provided at one end in the first output shaft. The plug prevents oil flow from the oil channel for the first gearset through the first output shaft. Oil flow is enabled through the first output shaft.

In an embodiment, the oil guiding arrangement includes a bearing which rotatably supports the first carrier in the second output shaft. The oil channel for the first bolt includes a bearing seat for the bearing of the first carrier. In particular, the oil channel for the first bolt lubricates the bearing of the first carrier.

The first carrier extends at least partially within the second output shaft. The first carrier and the second output shaft form an annular gap. In the annular gap, the bearing seat for the bearing of the first carrier is formed. The bearing of the first carrier may be a plain bearing. The bearing of the first carrier may be a needle bearing. A recess, for example a groove, is formed in the oil flow direction along the bearing of the first carrier in the second output shaft. A recess, for example a groove, is formed in the oil flow direction along the bearing of the first carrier in the first carrier. The recess in the second output shaft and the recess in the first carrier serve for adjusting a flow quantity through the oil channel for the first bolt.

In an embodiment, the oil guiding arrangement includes a first axial bearing which rotatably supports the first carrier on the second output shaft. The oil channel for the first bolt includes a bearing seat for the first axial bearing of the first carrier.

In the annular gap between the first carrier and the second output shaft, the bearing seat for the first axial bearing of the first carrier is formed. The first axial bearing of the first carrier may be a plain bearing. The first axial bearing of the first carrier may be a needle bearing. A recess, for example a groove, is formed in the oil flow direction along the first axial bearing of the first carrier in the second output shaft. A recess, for example a groove, is formed in the oil flow direction along the first axial bearing of the first carrier in the first carrier. The recess in the second output shaft and the recess in the first carrier serve for adjusting a flow quantity through the oil channel for the first bolt.

In an embodiment, the oil guiding arrangement includes a second axial bearing which rotatably supports the first carrier. The second axial bearing supports the first carrier at a first sun gear of the first gearset. The oil channel for the first spur gear includes a bearing seat for the second axial bearing of the first carrier.

In the annular gap between the first carrier and the first output shaft, the bearing seat for the second axial bearing of the first carrier is formed. The second axial bearing of the first carrier may be a plain bearing. The second axial bearing of the first carrier may be a needle bearing. A recess, for example a groove, is formed in the oil flow direction along the second axial bearing of the first carrier in the first carrier. The recess in the first carrier serves for adjusting a flow quantity through the oil channel for the first spur gear.

In an embodiment, the oil guiding arrangement includes a take-up toothing by which the first carrier is non-rotatably connected to the first output shaft. The oil channel for the first spur gear includes a passage within the take-up toothing.

The take-up toothing is a splined shaft connection. The passage within the take-up toothing may be formed between tooth root and tooth tip of tooth pairs. The passage within the take-up toothing may be formed between tooth flanks of tooth pairs. The passage is enlarged by omitting a tooth of the take-up toothing. The passage within the take-up toothing serves for adjusting a flow quantity through the oil channel for the first spur gear.

In an embodiment, the oil guiding arrangement includes a collecting component with a collecting surface. The oil channel for the first bolt includes an opening. The collecting surface catches oil from the opening in a radial direction and guides it to the first bolt in an axial direction.

The opening is at one end of the oil channel for the first gearset in the oil flow direction. The opening is formed in an axial direction. The collecting surface covers the opening of the the oil channel for the first gearset in an axial direction. The collecting surface may be disposed outside the opening in a radial direction of the oil channel for the first gearset. The oil channel for the first bolt includes an opening at one end in the direction of the collecting component.

In an embodiment, the first bolt includes a cavity and a recess which extends in a radial direction from the cavity of the first bolt through the first bolt to an outer side of the first bolt.

The cavity is formed by a bore in an axial direction. A recess is formed by a bore. The recess is disposed in a radial direction. The diameter of the recess is smaller than the diameter of the cavity. The bolt includes a plurality of recesses. The recesses are evenly distributed in the circumferential direction. The bolt includes two recesses. The recesses are disposed centrally with respect to a bearing for the first spur gear. As a result, the lubrication of the bearing for the first spur gear and the lubrication of the first spur gear are effected centrally.

The collecting surface catches oil from the opening in a radial direction and guides it to the cavity of the first bolt in an axial direction. The opening of the oil channel for the first spur gear forms a stripping edge or separation edge. As a result, a targeted flow separation of the oil from the oil channel of the first spur gear is achieved. The stripping edge extends in an axial direction to within the collecting surface of the collecting component.

In an aspect, a transmission includes an input element, a first gearset, a second gearset, and an oil guiding arrangement according to any one of the preceding aspects and embodiments. The input element is configured for transmitting a torque to the first gearset. The first gearset and the second gearset are mechanically operatively connected to each other such that a torque is transmittable from the first gearset to the second gearset. The first output shaft is configured for outputting a torque from the first gearset. The second output shaft is configured for outputting a torque from the second gearset. The first gearset and the second gearset have the function of a differential. The input element, the first output shaft, the second output shaft, the oil guiding component, and the first carrier are arranged coaxially.

In an embodiment, the first gearset is a first planet gearset with a first planet gear and the second gearset is a second planet gearset. The first carrier is a first planet carrier. The first bolt is a first planet bolt. The first planet gear is the first spur gear. The first gearset and the second gearset are offset from each other in an axial direction.

In an aspect, a vehicle includes drive wheels and a transmission according to any one of the preceding aspects or embodiments. The first output shaft is configured for driving one of the drive wheels. The second output shaft is configured for driving another one of the drive wheels.

DETAILED DESCRIPTION

Figure 1:
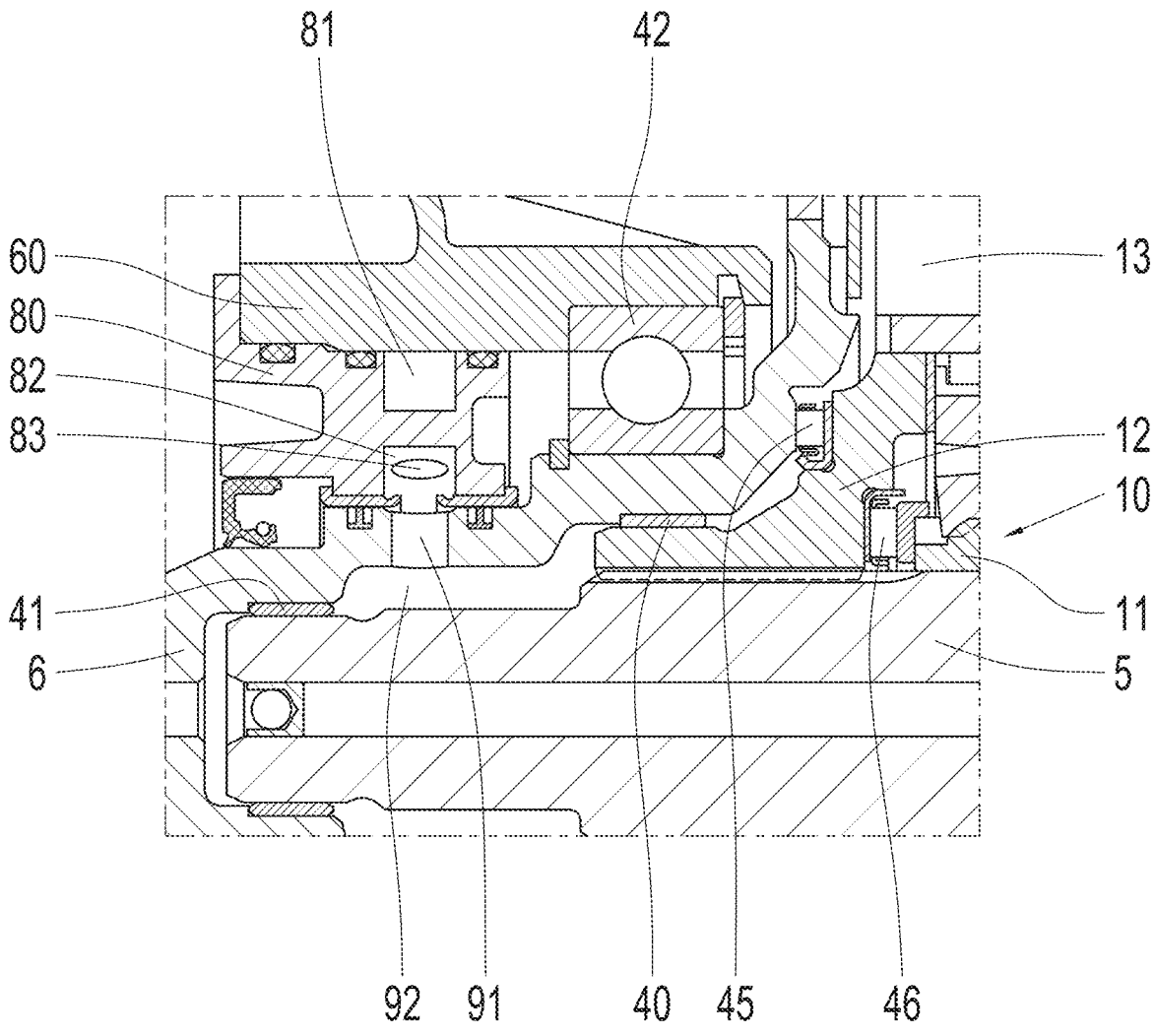
FIG. 1 shows a sectional view of an embodiment of an oil guiding arrangement including an oil guiding component.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a sectional view of an embodiment of an oil guiding arrangement including an oil guiding component 80. The oil guiding arrangement includes a first carrier, in the present case a first planet carrier 12, a first bolt, in the present case a first planet bolt 13, a stationary component 60 with a main oil channel 90 (FIG. 2), a first output shaft 5, and a second output shaft 6. The oil guiding component 80 includes a first chamber 81 and a second chamber 82.

The first chamber 81 is fluidly connected to the second chamber 82 via a connection passage 83. The oil guiding component 80 is in the stationary component 60 and rotationally fixedly connected to the stationary component 60. The oil guiding component 80 is fluidly connected to the main oil channel 90 via the first chamber 81. The second chamber 82 provides oil for a bearing 40 of the first carrier 12, a bearing 41 of the first output shaft 5, a first bearing 42 of the second output shaft 6, a first axial bearing 45 of the first carrier 12, a second axial bearing 46 of the first carrier 12, and a first gearset, in the present case a planet gearset 10. Oil channels are formed as annular gaps. The oil guidance is thereby possible in a simple manner. In particular, with the present embodiment of the oil guiding arrangement, an oiling of the first gearset 10 is possible without radial bores in the first output shaft 5.

Further details of the oil guiding arrangement are described below.

The second output shaft 6 is rotatably supported in the stationary component 60 by the first bearing 42. The first output shaft 5 extends sectionwise in an axial direction in the second output shaft 6 and is rotatably supported by the bearing 41 in the second output shaft 6. The first planet carrier 12 extends in regions in an axial direction in the second output shaft 6. The first output shaft 5 extends through the first planet carrier 12. The first planet carrier 12 is non-rotatably connected to the first output shaft 5 by a take-up toothing. The first planet carrier 12 is rotatably supported on the second output shaft 6 by the bearing 40 and by the first axial bearing 45. The first planet carrier 12 is rotatably supported on a first sun gear 11 of the first planet gearset 10 by the second axial bearing 46. The first output shaft 5, the second output shaft 6, the first sun gear 11, the first planet carrier 12, and the oil guiding component 80 are arranged coaxially with each other.

The first chamber 81 of the oil guiding component 80 is open in a radial direction toward an outer side. The second chamber 82 of the oil guiding component 80 is open in a radial direction toward an inner side. The first chamber 81 is disposed outside the second chamber 82 in a radial direction and is aligned with the second chamber 82 such that the first chamber 81 overlaps the second chamber 82 in an axial direction.

The first chamber 81 is disposed between two grooves on an outer circumferential surface of the oil guiding component 80. In each of the two grooves, an O-ring seal is disposed. The O-ring seals each abut the stationary component 60. Thus, the first chamber 81 is sealed to the left and right in FIG. 1 toward an outer side.

A first end portion arranged on the right in FIG. 1 at which the first chamber 81 is arranged includes an outer circumference with a diameter smaller than a diameter of an outer circumference of a second end portion located opposite in an axial direction. This configuration serves as an insertion aid for inserting the oil guiding component 80 into the stationary component 60. A further groove with a further O-ring seal is disposed on the second end region.

The second chamber 82 is disposed between two cylindrical annular surfaces on an inner circumferential surface. On each of the inner circumferential surfaces, a rectangular ring is arranged. The rectangular rings are rotationally fixedly arranged on the oil guiding component 80 and abut in grooves on an outer circumference of the second output shaft 6. Thus, the second chamber 82 is sealed to the right and left in FIG. 1 toward an outer side.

The second output shaft 6 is rotatable relative to the oil guiding component 80. A slight leakage thereby arises across the rectangular ring on the left in FIG. 1. To the left of the left rectangular ring, a radial shaft seal ring is arranged on a cylindrical receiving surface on an inner circumference of the oil guiding component 80. The cylindrical receiving surface includes grooves in the circumferential direction for receiving the radial shaft seal ring. Between the radial shaft seal ring and the left rectangular ring, a drain hole is provided which prevents oil build-up and is arranged such that the radial shaft seal ring is sufficiently supplied with oil.

In addition, a slight leakage arises across the rectangular ring on the right in FIG. 1. The leakage serves for oiling the first bearing 42 of the second output shaft 6.

The second chamber 82 is fluidly connected to the shaft passage 91. Via the shaft passage 91, an outer side of the second output shaft 6 is in fluid communication with an inner space or side of the second output shaft 6 at the location of the second chamber 82. Thus, the main oil channel 90 (FIG. 2) is fluidly connected to the shaft passage 91 via the oil guiding component 80.

An oil channel 92 for the first gearset 10 is formed by an annular gap between the first output shaft 5 and the second output shaft 6. The shaft passage 91 opens into the oil channel 92 for the first gearset 10. The oil channel 92 for the first gearset 10 guides oil to the bearing 41 of the first output shaft 5. The first output shaft 5 is hollow and closed by a plug. In this respect, no oil flows from the bearing 41 of the first output shaft 5 through the first output shaft 5. The second output shaft 6 is not hollow. In this respect, no oil flows from the bearing 41 of the first output shaft 5 through the second output shaft 6.

Figure 2:
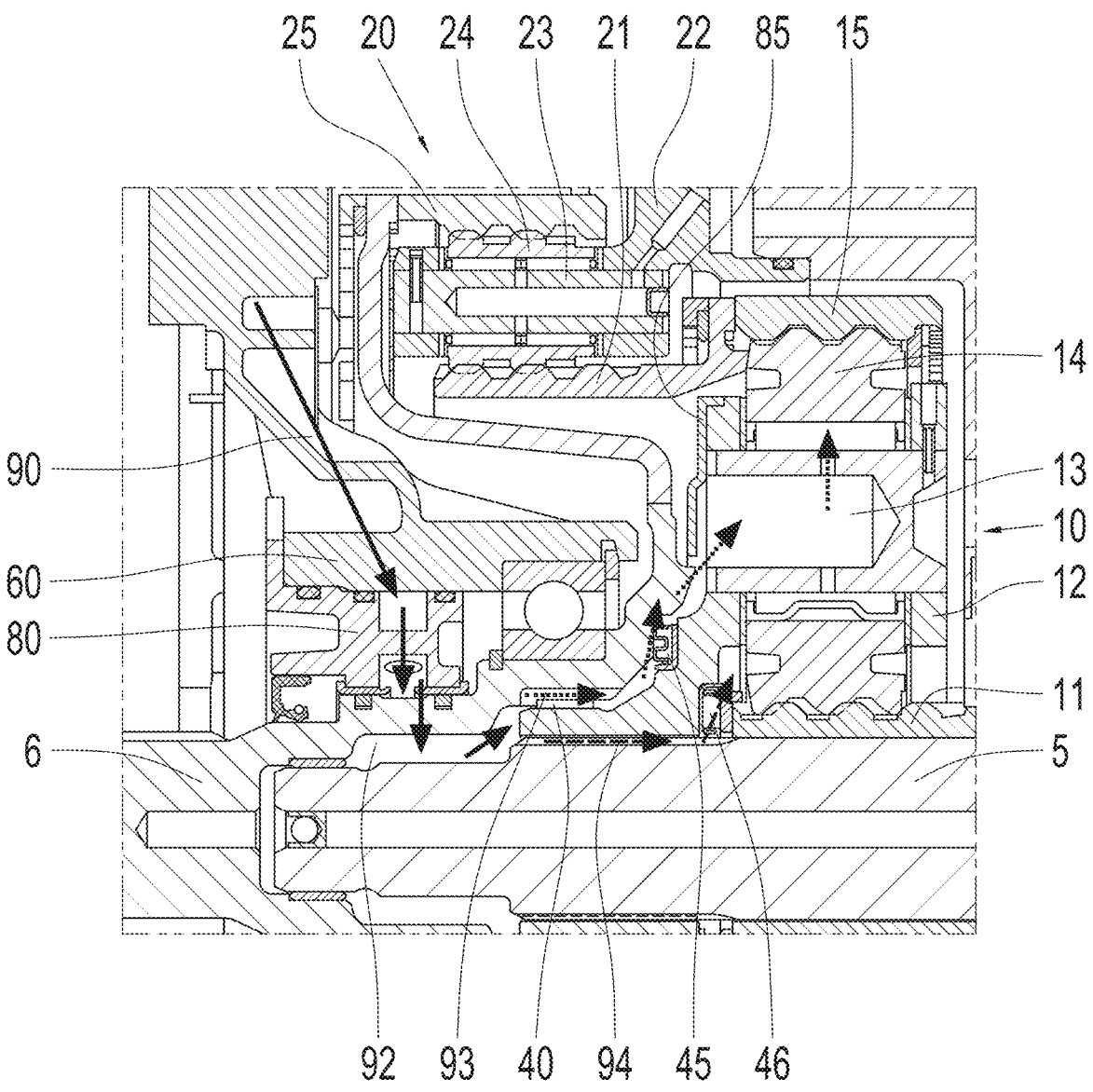
FIG. 2 shows a sectional view of an embodiment of the oil guiding arrangement.

FIG. 2 shows a sectional view of an embodiment of the oil guiding arrangement. The present embodiment includes all the features of the preceding embodiment. An oil flow is shown in FIG. 2 with bold arrows.

An oil channel 93 for the first bolt 13 is formed by an annular gap between the first carrier 12 and the second output shaft 6. The oil channel 93 for the first bolt 13 is fluidly connected with one end of the oil channel 92 for the first gearset 10. The oil channel 93 for the first bolt 13 includes a bearing seat for the bearing 40 of the first carrier and a bearing seat for the first axial bearing 45 of the first carrier 12 and lubricates these bearings 40, 45. The oil channel 93 for the first bolt 13 is fluidly connected via a collecting component 85 with a cylindrical cavity in the first bolt 13. The collecting component 85 is non-rotatably connected to the first carrier 12. The collecting component 85 is configured to catch oil from an opening of the oil channel 93 for the first bolt 13 in a radial direction and guide it to the cavity of the first bolt 13 in an axial direction.

The first bolt 13 includes two recesses which extend in a radial direction from the cavity of the first bolt 13 through the first bolt 13 to an outer side of the first bolt 13. The recesses are formed by bores. The recesses are arranged opposite each other. The recesses are disposed centrally with respect to a bearing for a first spur gear, in the present case a first planet gear 14. Via the recesses, the bearing for the first spur gear 14 of the first gearset 10 is lubricated.

An oil channel 94 for the first spur gear 14 is formed by an annular gap between the first output shaft 5 and the first carrier 12. The oil channel 94 for the first spur gear 14 is fluidly connected with the end of the oil channel 92 for the first gearset 10. The oil channel 94 for the first spur gear 14 includes a bearing seat for the second axial bearing 46 of the first carrier 12 and lubricates this bearing. Via the second axial bearing 46, the oil channel 94 for the first spur gear 14 is configured such that oil is conducted to the first spur gear 14. In particular, the oil channel 94 for the first spur gear 14 is fluidly connected with the first spur gear 14.

In particular, the oil channel 92 for the first gearset 10 branches into the oil channel 93 for the first bolt 13 and into the oil channel 94 for the first spur gear 14.

The first planet gearset 10 includes the first sun gear 11, the first planet carrier 12, a number of first planet bolts 13, a number of first planet gears 14, and a first ring gear 15. The first sun gear 11 is in engagement with one of the first planet gears 14. One of the first planet gears 14 is in engagement with the first ring gear 15 and rotatably supported on one of the first planet bolts 13. The first planet bolts 13 are connected to the first planet carrier 12.

The second gearset, in the present case a second planet gearset 20, is offset from the first gearset 10 in an axial direction. The second gearset 20 includes a second sun gear 21, a second planet carrier 22, a number of second planet bolts 23, a number of second planet gears 24, and a second ring gear 25. The second sun gear 21 is in engagement with one of the second planet gears 24. One of the second planet gears 24 is in engagement with the second ring gear 25 and rotatably supported on one of the second planet bolts 23. The second planet bolts 23 are connected to the second planet carrier 22. The second planet carrier 22 is connected to the stationary component 60. The first ring gear 15 and the second sun gear 21 are rotationally fixedly connected to each other.

Figure 3:
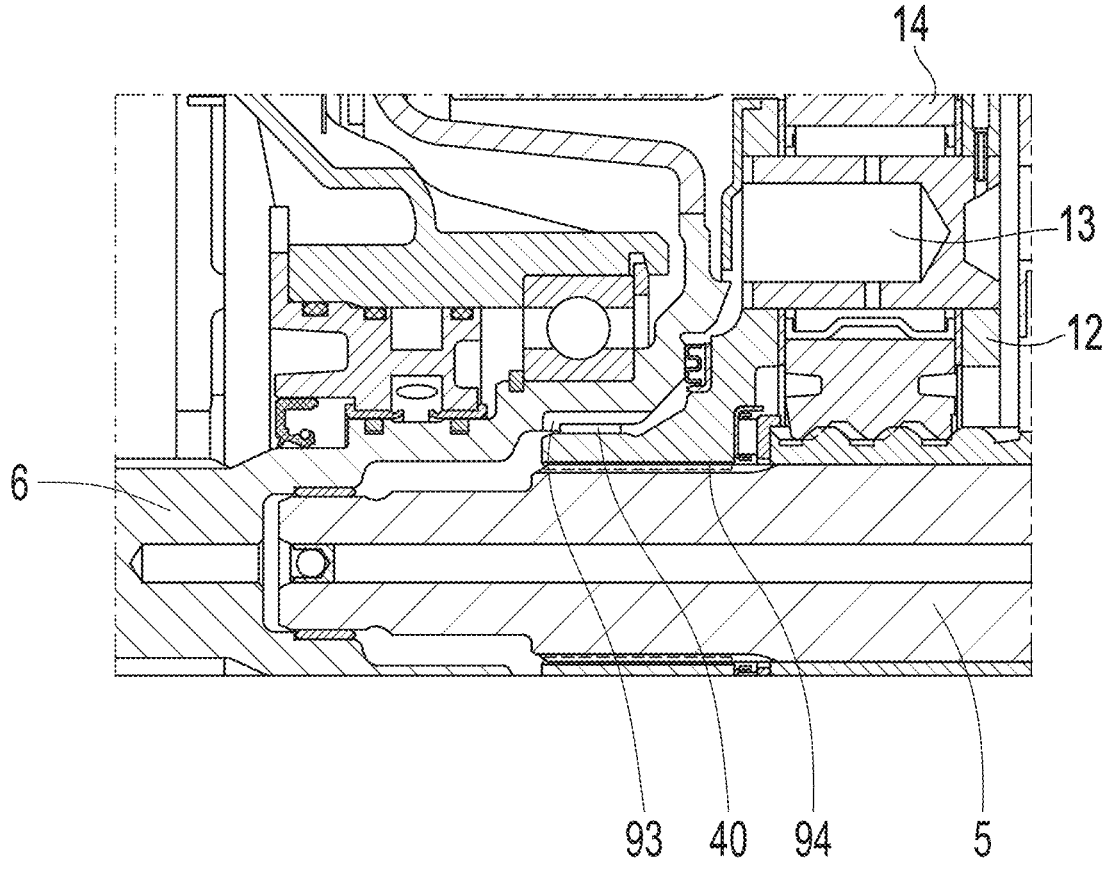
FIG. 3 shows a sectional view of an embodiment of the oil guiding arrangement.

FIG. 3 shows a sectional view of an embodiment of the oil guiding arrangement. The present embodiment includes all the features of any one of the preceding embodiments.

The oil channel 93 for the first bolt includes a recess. The recess is formed in the second output shaft 6 in the oil flow direction along the bearing seat for the bearing 40 of the first carrier 12. The recess in the second output shaft 6 serves for adjusting a flow quantity through the oil channel 93 for the first bolt 13.

The oil channel 94 for the first spur gear 14 includes a passage through the take-up toothing of the first output shaft 5 and of the first carrier 12. A tooth on the first output shaft 5 is removed in the take-up toothing. This enlarges the passage through the take-up toothing and serves for adjusting a flow quantity through the oil channel 94 for the first spur gear.

Figure 4:
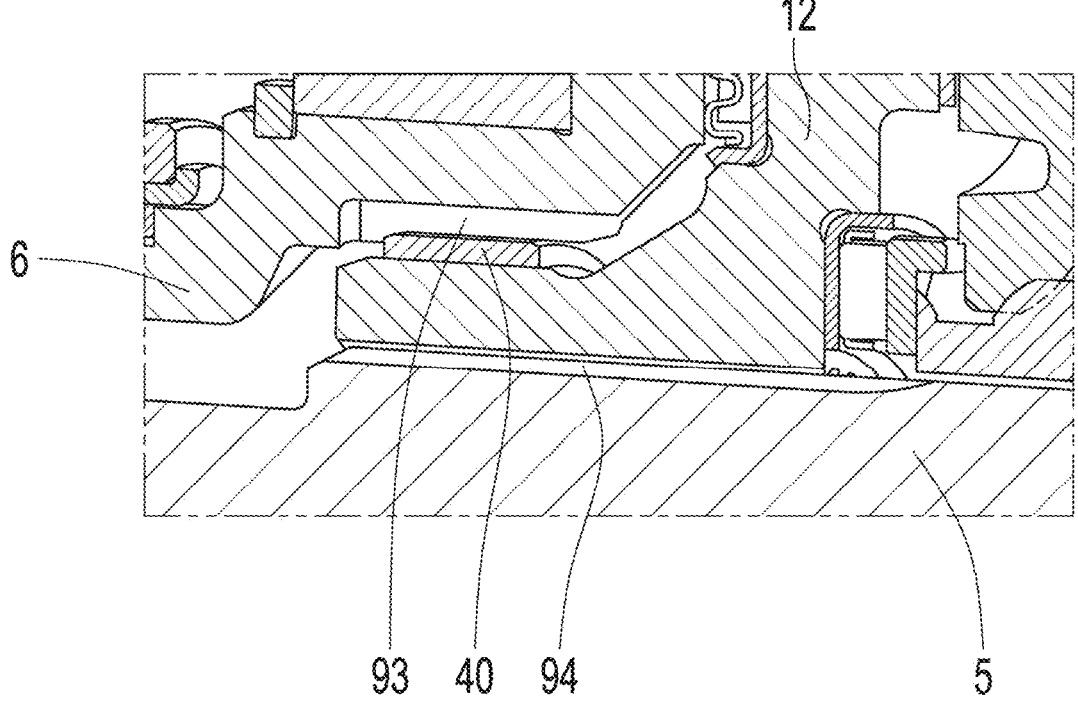
FIG. 4 shows a three-dimensional, perspective detail view of the sectional view of FIG. 3.

FIG. 4 shows a three-dimensional detail view of the sectional view of FIG. 3. In particular, the recess of the oil channel 93 for the first bolt 13 (FIGS. 1-3) is shown here, which recess is formed in the second output shaft 6 along the bearing 40 for the first carrier 12. In particular, the passage of the oil channel 94 for the first spur gear 14 (FIGS. 2-3) is shown here, which passage is formed by removing a tooth on the first output shaft 5.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE SIGNS

5 first output shaft
6 second output shaft
10 first planet gearset
11 first sun gear of the first planet gearset
12 first planet carrier of the first planet gearset
13 first planet bolt of the first planet gearset
14 first planet gear of the first planet gearset
15 first ring gear of the first planet gearset
20 second planet gearset
21 second sun gear of the second planet gearset
22 second planet carrier of the second planet gearset
23 second planet bolt of the second planet gearset
24 second planet gear of the second planet gearset
25 second ring gear of the second planet gearset
40 bearing of the first carrier
41 bearing of the first output shaft
42 first bearing of the second output shaft
45 first axial bearing of the first carrier
46 second axial bearing of the first carrier
60 stationary component
80 oil guiding component
81 first chamber
82 second chamber
83 connection passage
85 collecting component
90 main oil channel

91 shaft passage
92 oil channel for the first gearset
93 oil channel for the first bolt
94 oil channel for the first spur gear

The invention claimed is:

1. An oil guiding component (80) for an oil guiding arrangement comprising a stationary component (60) with a main oil channel (90), a first output shaft (5), and a second output shaft (6), an outer side of the second output shaft (6) being in fluid communication with an inner space of the second output shaft (6) via a shaft passage (91), the oil guiding component (80) comprising:

a body rotationally fixedly connectable to the stationary component (60), the body defining:

a first chamber (81), the first chamber (81) being open in a radial direction toward an outer side of the body, the first chamber (81) being fluidly connectable to the main oil channel (90); and a second chamber (82), the second chamber (82) being open in the radial direction toward an inner side of the body, the first chamber (81) being outside of the second chamber (82) in the radial direction, the first chamber (81) overlapping the second chamber (82) in an axial direction, the first chamber (81) being fluidly connected to the second chamber (82) via a connection passage (83), the second chamber (82) being fluidly connectable to the shaft passage (91).

2. The oil guiding component (80) of claim 1, wherein two grooves are formed on a circumferential surface of the body of the oil guiding component (80) to accommodate a seal, the first chamber (81) being defined between the two grooves.

3. The oil guiding component (80) of claim 1, wherein two cylindrical annular surfaces are formed on a circumferential surface of the body of the oil guiding component (80) to accommodate a seal member, the second chamber (82) being defined between the two cylindrical annular surfaces.

4. The oil guiding component (80) of claim 3, wherein a cylindrical receiving surface is formed on the circumferential surface for receiving a radial shaft seal ring between one of the two cylindrical annular surfaces and an outer side of the oil guiding component.

5. The oil guiding component (80) of claim 4, wherein a drain hole is defined in the body between the cylindrical receiving surface and one of the two cylindrical annular surfaces.

6. The oil guiding component (80) of claim 1, wherein a first end portion of the body at which the first chamber (81) is defined has an outer circumference with a diameter smaller than an outer circumference of a second end portion of the body located opposite the first end portion in the axial direction.

7. An oil guiding arrangement for a transmission, comprising:

a first gearset with a first spur gear, a first carrier, and a first bolt, the first bolt rotatably supporting the first spur gear and being connected to the first carrier;

a first output shaft (5);

a second output shaft (6), an outer side of the second output shaft (6) being in fluid communication with an inner space of the second output shaft (6) via a shaft passage (91), an oil channel (92) for the first gearset being defined by a first gap between the first output shaft (5) and the second output shaft (6) and being fluidly connected with the shaft passage (91), an oil channel (93) for the first bolt being defined by a second gap between the first carrier and the second output shaft (6) and fluidly connected with the oil channel (92) for the first gearset, an oil channel (94) for the first spur gear being defined by a third gap between the first output shaft (5) and the first carrier and fluidly connected with the oil channel (92) for the first gearset;

a stationary component (60), the stationary component (60) defining a main oil channel (90); and an oil guiding component (80) rotationally fixedly connectable to the stationary component (60), the main oil channel (90) being fluidly connected to the shaft passage (91) via the oil guiding component (80), the oil guiding component (80) defining:

a first chamber (81), the first chamber (81) being open in a radial direction toward an outer side of the oil guiding component (80), the first chamber (81) being fluidly connectable to the main oil channel (90); and a second chamber (82), the second chamber (82) being open in the radial direction toward an inner side of the oil guiding component (80), the first chamber (81) being outside of the second chamber (82) in the radial direction, the first chamber (81) overlapping the second chamber (82) in an axial direction, the first chamber (81) is fluidly connected to the second chamber (82) via a connection passage (83), the second chamber (82) being fluidly connectable to the shaft passage (91).

8. The oil guiding arrangement of claim 7, further comprising a bearing (41) of the first output shaft (5), the bearing (41) of the first output shaft (5) rotatably supporting the first output shaft (5) in the second output shaft (6), the oil channel (92) for the first gearset being fluidly connected with the bearing (41) of the first output shaft (5).

9. The oil guiding arrangement of claim 7, further comprising a bearing (40) of the first carrier, the bearing (40) of the first carrier rotatably supporting the first carrier in the second output shaft (6), the oil channel (93) for the first bolt defining a bearing seat for the bearing (40) of the first carrier.

10. The oil guiding arrangement of claim 7, further comprising a first axial bearing (45) of the first carrier, the first axial bearing (45) of the first carrier rotatably supporting the first carrier on the second output shaft (6), the oil channel (93) for the first bolt defining a bearing seat for the first axial bearing (45) of the first carrier.

11. The oil guiding arrangement of claim 7, further comprising a second axial bearing (46) of the first carrier, the second axial bearing (46) rotatably supporting the first carrier, the oil channel (94) for the first spur gear defining a bearing seat for the second axial bearing (46) of the first carrier.

12. The oil guiding arrangement of claim 7, wherein the first carrier is non-rotatably connected to the first output shaft (5) by a take-up toothing, the take-up toothing being defined in the oil channel (94) for the first spur gear.

13. The oil guiding arrangement of claim 7, further comprising a collecting component (85) with a collecting surface, the collecting surface being configured to guide oil from an opening of the oil channel (93) for the first bolt defined in the radial direction and to the first bolt in the axial direction.

14. The oil guiding arrangement of claim 7, wherein the first bolt comprises a cavity and a recess, the recess of the first bolt extending through the first bolt in the radial direction from the cavity of the first bolt to an outer side of the first bolt.

15. A transmission, comprising:

the oil guiding arrangement of claim 7;

an input element, the input element being configured to transmit torque to the first gearset; and a second gearset, the first gearset and the second gearset being mechanically operatively connected to each other such that torque is transmittable from the first gearset to the second gearset, wherein the first output shaft (5) outputs a first torque from the first gearset, and wherein the second output shaft (6) outputs a second torque from the second gearset.

16. The transmission of claim 15, wherein the first gearset is a first planet gearset (10) with a first planet gear (14), the first planet gear (14) being the first spur gear, the first carrier being a first planet carrier (12), and the first bolt being a first planet bolt (13), and wherein the second gearset comprises a second planet gearset (20).

17. A vehicle, comprising:

drive wheels; and the transmission of claim 15, the first output shaft (5) being configured for driving one of the drive wheels, and the second output shaft (6) being configured for driving another one of the drive wheels.

* * * * *